United States Patent [19]
Gersbach et al.

[11] Patent Number: 5,295,155
[45] Date of Patent: Mar. 15, 1994

[54] MULTI-LEVEL DIGITAL DATA REGENERATION SYSTEM

[75] Inventors: John E. Gersbach, Burlington; Ilya I. Novof, Essex Junction, both of Vt.; Joseph K. Lee, Raleigh, N.C.

[73] Assignee: International Business Machines Corporation, Armonk, N.Y.

[21] Appl. No.: 968,716

[22] Filed: Oct. 30, 1992

[51] Int. Cl.⁵ .............................................. H04L 25/60
[52] U.S. Cl. .......................................... 375/4; 375/76; 375/20
[58] Field of Search ...................... 375/3, 4, 17, 20, 76, 375/119; 455/7; 370/75, 97; 379/338, 341

[56] References Cited

U.S. PATENT DOCUMENTS

| | | | |
|---|---|---|---|
| 4,403,330 | 9/1983 | Meyer | 375/4 |
| 4,821,286 | 4/1989 | Graczyk et al. | 375/4 |
| 5,022,056 | 6/1991 | Henderson et al. | 375/119 |
| 5,204,879 | 4/1993 | McConnell | 375/20 |

OTHER PUBLICATIONS

"Base Digital Transmission", *Transmission Systems for Communications*, AT&T Bell Labs, pp. 703–714.

*Primary Examiner*—Curtis Kuntz
*Assistant Examiner*—Hai H. Phan
*Attorney, Agent, or Firm*—Calfee Halter & Griswold

[57] ABSTRACT

An adaptive regeneration system is provided for reconstructing a signal received in the form of a multi-level composite data and clock signal which has been degraded with respect to amplitude and timing. The system includes a local clock circuit for outputting a plurality of phase-delayed local clock signals, and a clock recovery circuit for receiving the received multi-level signal and the plurality of phase-delayed clock signals and extracting a phase-delayed local clock signal which most accurately represents the phase shift between the received multi-level signal and the local clock signal. A threshold level selection circuit receives the extracted phase-delayed local clock signal and the received multi-level signal and outputs in real time a data amplitude reading and a plurality of multi-level threshold levels corresponding to the amplitude levels of the received multi-level signal. A data regenerator receives the data amplitude reading, the plurality of multi-level threshold levels and the extracted phase-delayed signal and reconstructs and outputs the received multi-level signal essentially in its originally transmitted form.

15 Claims, 6 Drawing Sheets

MULTI-LEVEL DIGITAL DATA REGENERATION SYSTEM

TECHNICAL FIELD

The present invention relates generally to data regeneration circuitry, and more specifically to a data regeneration circuit which compensates for changes in both amplitude and timing of a received multi-level digital composite clock and data signal.

BACKGROUND OF THE INVENTION

In multi-level digital data transmission systems, data in multi-level digital form is transmitted over media such as wires or fiber optic cables from a transmission line transmitter to a transmission line receiver. Multi-level signalling is widely used when high speed data needs to be transmitted through a narrow bandwidth cable, e.g., a 100 Mbit/second data transmission rate transmitted over a twisted pair cable. The multi-level data waveform is degraded with respect to its instantaneous frequency and its amplitude as it propagates along the transmission media due to electrical noise and dispersion. Electrical noise refers to the unwanted components of an electrical signal that tend to disturb accurate transmission and processing of the signal. Dispersion relates to pulse spreading of the signal and is measured in terms of time per distance traveled.

The transmission line receiver typically includes a regenerative repeater for reconstructing the transmitted multi-level data signal, regardless of electrical noise and transmission media degradations. The data signal is thereby permitted to travel through a dispersive and noisy medium, but instead of becoming more and more degraded until eventually the individual data bits are unrecognizable, the bits are repeatedly reconstructed and thus remain impervious to most of the degradation introduced by the transmission medium.

In the case of long distance, high capacity digital systems, the accuracy of the regenerative repeaters will often determine the overall effectiveness of the system. The function of the repeaters is to regenerate the transmitted data signal in its original form, ideally without error. Such reconstruction can be achieved by sampling the data signal at a regular frequency equal to the bit rate, and at each sample instant making a decision of the most probable symbol being transmitted. Typically, threshold levels are chosen to which the received signal is compared. Above each particular threshold level a binary one is registered, and below each of these thresholds a binary zero is registered. The regenerator circuit makes these zero or one decisions at times corresponding to the center of the bit intervals based on the clock information provided by a timing circuit. The center of the bit intervals generally correspond to the mid-points of the threshold level crossings of the multi-level data signal. By setting the decision times midway between the threshold level crossings, the odds of accurately reconstructing the transmitted bit are increased.

Repeaters in analog systems filter, equalize and amplify the received waveform, but are unable to reconstitute the originally transmitted waveform entirely free from degradation and noise. Signal degradation in long distance analog systems is therefore cumulative being a direct function of the number of repeater stages. In contrast, the signal degradation encountered in digital data transmission systems is purely a function of the quantization process and the system bit error rate. Hence, the possible regeneration of an exact replica of the originally transmitted waveform is a major advantage of digital transmission over corresponding analog systems.

Errors may still occur in the digital regeneration process, however, from various noises and disturbances associated with the regenerator. The noise sources can be either external of the system (for example, atmospheric noise or equipment generated noise) or internal to the system. Internal noise is present in every communications system and represents a basic limitation on the transmission and detection of signals. Hence, the amplitude of the received signal may be degraded to the point where the signal to noise ratio at the decision instant may be insufficient for an accurate decision to be made. For instance, with high noise levels, the binary zero may occur above a particular threshold and hence be registered as a binary one.

Moreover, the actual received multi-level data transmissions may be displaced in time from the true transmission. This time displacement, or intersymbol interference (ISI), of the transitions is caused by a new wave arriving at the receiver before the previous wave has reached its final value. Intersymbol interference (ISI) occurs due to pulse spreading caused by the dispersion of the transmission media. Variations in the clock rate and phase degradations (jitter) also distort the zero crossings resulting in decision time misalignment. When a pulse is transmitted in a given time slot, most of the pulse energy will arrive in the corresponding time slot at the receiver. However, because of this pulse spreading induced by the transmission medium, some of the pulse energy will progressively spread into adjacent time slots resulting in an interfering signal.

It is an object of the present invention, therefore, to provide a high-speed, low-power regeneration system for regenerating multi-level digitally transmitted data, wherein data is sampled at the transmitted data rate to compensate for both instantaneous frequency and amplitude variances.

SUMMARY OF THE INVENTION

The present invention provides a regeneration system adapted to receive a transmitted multi-level digital signal, which is a composite clock and data signal degraded with respect to its amplitude and timing, and to accurately regenerate the originally transmitted signal free of degradation. The system includes a local clock circuit, a clock recovery circuit, a threshold level selection circuit, and a data regenerator.

The received multi-level digital signal is used as an input to both the clock recovery circuit and the threshold level selection circuit. The clock recovery circuit includes a local oscillator which outputs a local clock signal operating at a frequency near that of a received composite clock and data signal, and a delay element for establishing a plurality of phase-delayed local clock signals. A data edge sorting circuit sorts edge transitions in the received composite signal into a number of time intervals corresponding to the number of phase-delayed local clock signals. The data edge sorting circuit thereby provides an instantaneous indication of the approximate location in time of a data edge transition relative to the local clock signal.

A series of counters counts the number of positive and negative going transitions (edge sorts) occurring during respective time intervals and stores this information. The transitions which are stored in the bank of counters provide a statistical distribution, or histogram, of the transitions occurring over time. A sampling clock phase decision table receives the outputs of the individual counters and identifies the clock phase corresponding to the middle of the depression of the histogram. The clock phase identified by the sampling clock phase decision table is selected by a multiplexer, the output of which is the extracted or recovered clock signal.

The recovered clock signal output by the clock recovery circuit is also used as an input to the threshold level selection circuit, along with the received multi-level digital signal. The recovered clock signal is used as a sampling pulse for the received multi-level signal. The threshold level selection circuit reads the instantaneous amplitude readings of the received data signal at the sample times. These data signal amplitude readings are sorted by a data sampling circuit into a number of amplitude sorting slots. These amplitude sorting slots are equally spaced over the full range of amplitudes of the data signal.

The amplitude sorts are stored in a bank of histogram counters, each of which corresponds to a particular amplitude sorting slot. The amplitude sorts which are stored in the bank of histogram counters over time provide a statistical distribution, or histogram, of the data amplitude sorts. A threshold level decision table receives the outputs of the individual histogram counters, analyzes the frequency distribution or histogram of this count data, and identifies the optimum threshold levels to which the multi-level signal should be compared.

The instantaneous amplitude readings of the received data signal read by the data amplitude sorting circuit and the identified threshold decision levels are each sent to the data regenerator. The data regenerator uses these two inputs, as well as the recovered clock signal, to regenerate the multi-level data signal in its originally transmitted form free of instantaneous frequency and amplitude distortion.

DETAILED DESCRIPTION OF THE PREFERRED EMBODIMENT

Figure 1A:
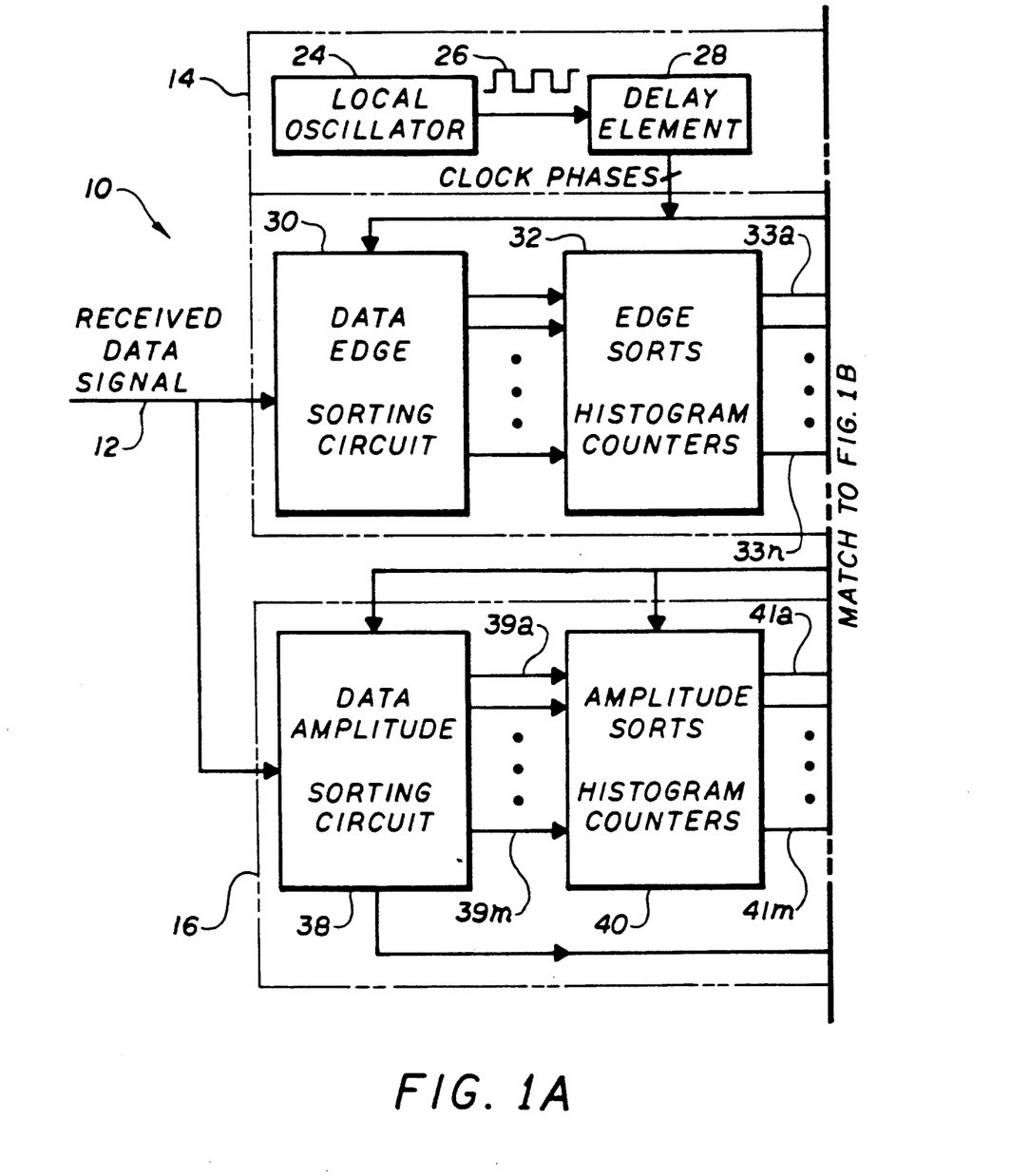
FIGS. 1A and 1B shows a schematic block diagram of a multi-level digital data regeneration system constructed according to the principles of the present invention.
Figure 1B:
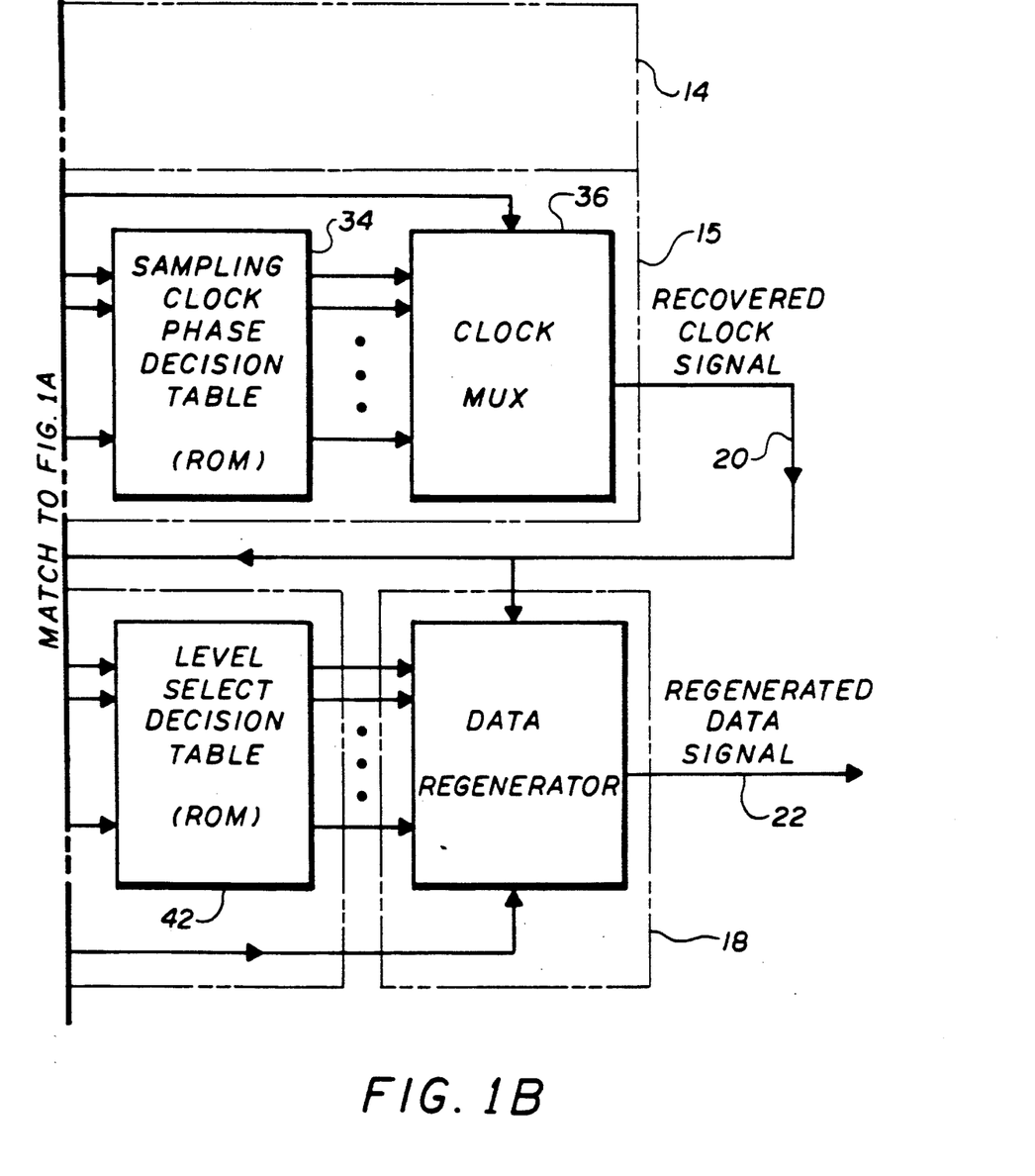

A block diagram of a multi-level digital data regeneration system constructed according to the principles of the present invention is shown generally as 10 in FIG. 1. The system 10 is adapted to receive a transmitted multi-level digital signal 12, which is a composite clock and data signal degraded with respect to its amplitude and timing, and to accurately regenerate the originally transmitted signal free of degradation. The system includes a local clock circuit 14, a clock recovery circuit 15, a threshold level selection circuit 16, and a data regenerator 18. Based on a recovered clock signal 20 output by the clock recovery circuit 15, and precise real time selection of threshold levels provided by the threshold level selection circuit 16, the data regenerator 18 may accurately reconstruct the received multi-level data signal as a regenerated data signal 22.

Figure 2A:
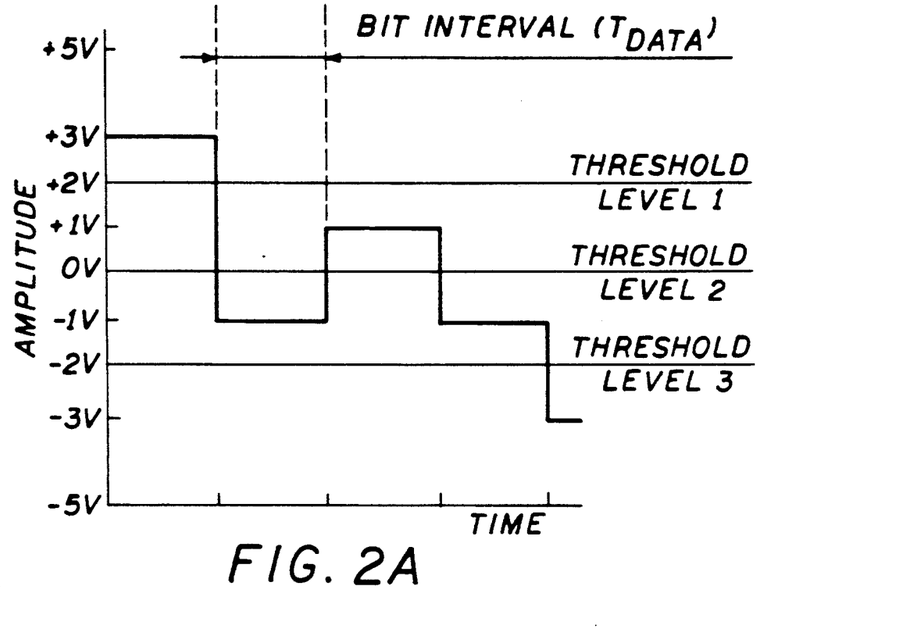
FIG. 2A is an illustration of a theoretical multi-level data signal which is transmitted over transmission media.

The theoretical form of a transmitted multi-level digital waveform is illustrated in FIG. 2A, which is a representation of a four-level partial response coded signal. The data is transmitted in bit intervals of period $T_{data}$. The voltage level of the waveform during a given bit interval (with respect to a particular threshold voltage level) determines whether a binary "one" or "zero" is being transmitted.

Figure 2B:
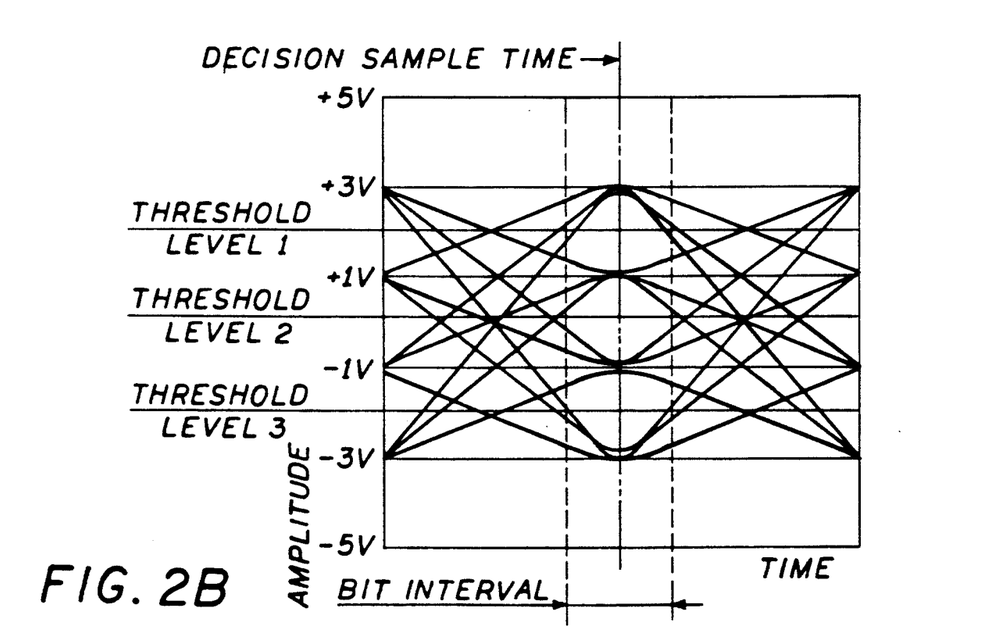
FIG. 2B is an illustration representing superimposed multi-level data pulses actually received by the system of FIG. 1.

The degraded multi-level digital signals which are received by the system 10 are shown superimposed one over another in FIG. 2B, which is typically referred to as a multi-level "eye diagram", and which represents the variances in amplitude and timing in the actual received multi-level signal 12 as compared to the theoretical waveform of FIG. 2A. Amplitude degradation is caused primarily by intersymbol interference (ISI), noise and variations in the output of regenerators at previous repeater stations. Timing degradation includes timing jitter and phase offsets of the received signal caused by drift that the received composite signal experiences during real time transmission over the transmission medium. The effect of timing and amplitude degradation of the pulses is to reduce the size of, or possibly close, the eye. The greater the eye closure becomes, due to timing and amplitude degradation, the more difficult it is to accurately reconstruct the received signal.

As shown in FIG. 2B, the area of each of the eye openings defines both (i) the time interval over which the received signal can be sampled without error from timing degradation and (ii) the amplitude range of the possible threshold levels to which the received signal may be compared. To minimize the bit error rate (BER) of the system, the best time to sample the received waveform is halfway through the bit interval (when voltage level transitions are least likely to occur), and the best threshold level lies halfway between the minimum and maximum amplitude levels defining a particular eye opening. The decision crosshair provided by the intersection of the optimum decision sample time and the optimum threshold level must, however, be altered as both the amplitude and timing degradation of the received multi-level signal change over time.

Referring back to FIG. 1, the received multi-level digital signal 12 which is degraded with respect to its amplitude and timing is used as an input to both the clock recovery circuit 15 and the threshold level selection circuit 16. A recovered clock signal 20 output by the clock recovery circuit 15 is also used as an input to the threshold level selection circuit 16. The data regenerator 18 uses the output of the threshold level selection circuit and the recovered clock signal 20 to regenerate the multi-level data signal in its originally transmitted form free of instantaneous frequency and amplitude distortion. The regenerator decides whether a particular level of a pulse is a binary one or zero at times corresponding to the center of the bit intervals based on the timing information provided by the clock recovery circuit 15, and threshold level selections provided by the threshold level selection circuit 16.

Figure 3A:
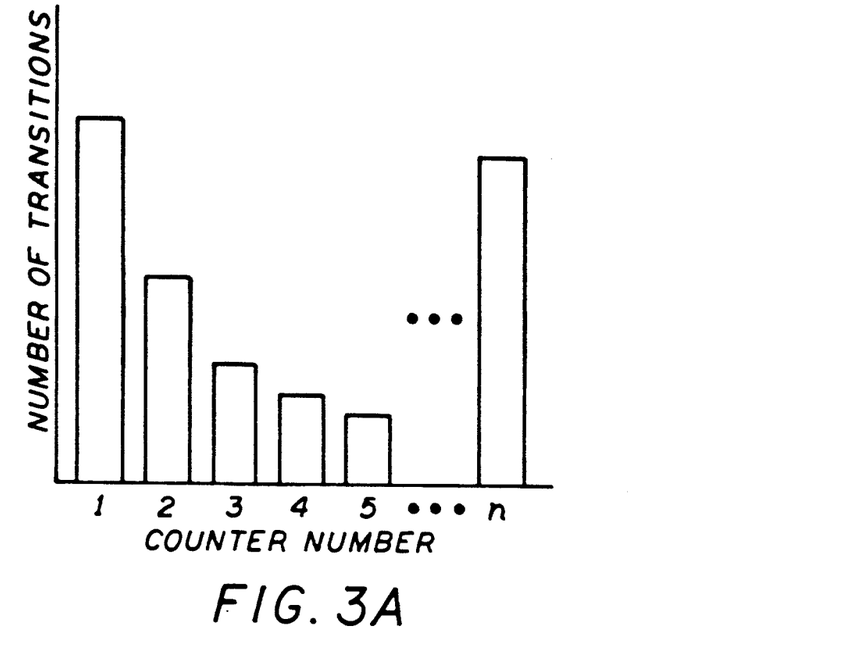
FIG. 3A is a histogram diagram resulting from the edge sorts accumulated in the edge sort counters of the system of FIGS. 1A and 1B.

The clock recovery circuit 15 includes a local oscillator 24 which outputs a local clock signal 26 operating at a frequency near that of a received composite clock and data signal 12, and a delay element 28 for establishing a plurality of phase-delayed local clock signals. A data edge sorting circuit 30 sorts edge transitions in the received composite signal 12 into a number of time intervals corresponding to the number of phase-delayed local clock signals. A series of histogram counters 32 counts the number of these transitions (edge sorts) occurring in each of the established time intervals. A sampling clock phase decision table 34 receives the outputs 33a-33n of the individual histogram counters 32 and identifies the clock phase corresponding to the middle of the depression of the histogram (see FIG. 3A). The clock phase identified by the sampling clock phase decision table 34 is selected by multiplexer 36, the output of which is the extracted or recovered clock signal 20.

As described with greater particularity, the local clock signal 26 output by the local oscillator 24 of the clock recovery circuit 15 operates at a phase and frequency which are nearly matched to those of the received composite signal 12. The local clock signal 26 and the received signal 12 could be slightly mismatched in frequency because the two signals originate at separate oscillators in different locations, and are mismatched in phase due to frequency mismatch and to jitter and drift caused by noise and the transmission medium. The extent to which the received composite signal and the local clock signal differ in phase and frequency must thereby be precisely determined in order to determine the optimum times at which sampling should occur. The local clock signal is used as a reference to which is compared the occurrence of transitions in the received composite signal 12.

The local clock signal 26 output by the local oscillator 24 is directed to the delay element 28 which outputs a plurality n of phase-delayed signals of the same frequency as the local clock signal 26. The sum of the delays of n phase-delayed signals corresponds to the period $T_{local}$ of the local clock signal. Each of these delayed signals is shifted in time about 1/n of a local clock signal period. For example, for a local clock signal period $T_{local}$ and a resolution of 10%, ten phase-shifted signals are output by the delay element 28, each of the signals being shifted successively in time by $T_{local}/10$. Of course, more or less than ten phase-shifted signals may be implemented. Generally, the greater the number of phase-delayed signals output by the delay element 28, the greater the phase resolution. As an alternative to the delay element 28, a series of n gates could be used, each having an inherent propagation delay of $T_{local}/n$.

The data edge sorting circuit 30 provides an instantaneous indication of the approximate location in time of a data edge transition relative to the local clock signal 28. Because of the timing mismatch between the local clock signal and the received composite signal, positive and negative going transitions in the received composite signal do not occur simultaneously with corresponding transitions in the local clock signal. The data edge sorting circuit receives each of the n phase-delayed local clock signals and establishes n time intervals per period $T_{local}$ corresponding to these n signals. The leading edge of one time interval occurs precisely at the trailing edge of a previous interval. The sorting circuit 30 also receives the incoming composite signal 12, senses the positive and negative going transitions of pulses in the signal, and sorts the positive and negative going transitions into these n time intervals. The output of the sorting circuit 30 thus provides an indication of the time intervals during which these transitions are occurring, and the phase shift of these transitions with respect to corresponding positive and negative going transitions in the local clock signal 26. By comparing the differences in frequency and phase of the received composite signal and the local clock signal, the sampling times may be adjusted on a real time basis to enable continuous and accurate reconstruction of the originally transmitted signal.

The series of counters 32 comprises counters 32a through 32n, one counter for each time interval established by the sorting circuit 30. Each of the individual counters 32a-n counts the number of positive and negative going transitions occurring during its respective time interval and stores this information by conventional means. Because the bit interval of the received composite signal is approximately the same as the local time clock period $T_{local}$, these n time intervals establish n periods in which a HIGH-LOW or LOW-HIGH transition may occur in the received composite signal. In practice, the period $T_{local}$ is configured to be slightly greater than $T_{data}$ to guarantee that each data transition will be detected and sorted into one of the n time intervals. Also, because the local clock period is slightly greater than the data clock period, two of the time interval counters 32a-n will (and thereafter periodically) accumulate counts at a faster rate than the remaining counters, even under a high jitter or high noise condition. This information may be used to select an appropriate phase-delayed local clock signal.

Thus, the particular counters 32 associated with each of the ten equal time intervals into which $T_{local}$ is divided provide a real time history of transitions in the received composite signal, enabling development of a continuous histogram of the transition phase distribution with respect to the local clock signal. By determining in real time the phase of the data signal with respect to the local clock signal, the optimal sampling points of the data signal may be ascertained. These optimal sampling points vary over real time, and thus the system provides a determination of the optimal sampling points based on changing operating conditions. Typically, at least two of the counters associated with the time intervals will experience relatively high counts, and the remaining counters will experience lower counts. If the two counters with the highest transition counts are identified, the sampling points may be selected precisely between these two transition points to ensure accurate data regeneration.

The sampling clock phase decision table 34 identifies one of the phase-delayed local clock signals for use in data re-timing based upon an analysis of the historical distribution of a predetermined number of sorted data edge transitions. The decision table 34 reads the output lines of each of the counters 32a-n, analyzes the frequency distribution or histogram of this count data, and determines via the histogram real time changes in the phase of the received composite signal 12 with respect to the local clock signal 26. Based on this identification, the multiplexer 36 extracts the phase-shifted local clock signal which most accurately represents the present phase shift between the received composite signal 12 and the local clock signal 26. In this manner, the device 10 permits accurate sampling and reconstruction of the originally transmitted data signal by eliminating the timing mismatch between the received composite signal 12 and the local clock signal 26.

As explained above, in addition to identifying the best time to sample the received waveform, the correct threshold levels for the particular eye openings must also be selected. The threshold level selection circuit 16 is provided for this purpose. The threshold level selection circuit 16 receives the recovered clock signal 20 and the received multi-level data signal 12. The recovered clock signal is used as a sampling pulse for the received multi-level signal.

The threshold level selection circuit 16 reads the instantaneous amplitude readings of the received data signal. The data signal amplitude readings at the sampling times are sorted by a data sampling circuit 38 into a number of amplitude sorting slots. These amplitude sorting slots are equally spaced over the full range of amplitudes of the data signal. The height of each of the amplitude sorting slots $\Delta A$, is equal to $A_{max}/m$, where $A_{max}$=the maximum data signal amplitude, and m=the number of amplitude sorting slots.

Figure 3B:
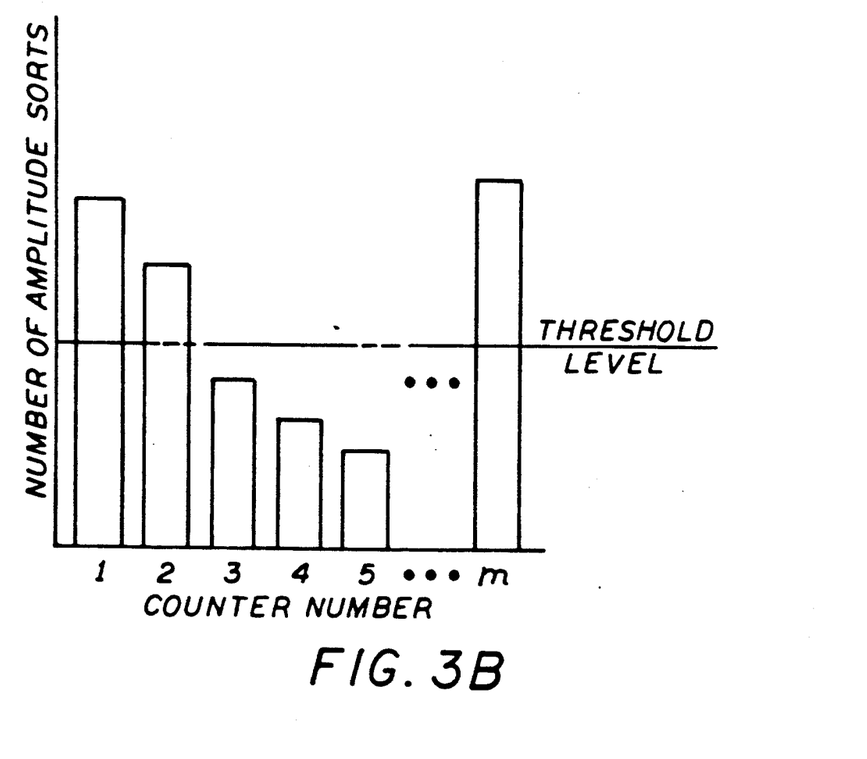
FIG. 3B is a histogram diagram resulting from the amplitude levels accumulated in the amplitude level counters of the system of FIG. 1.

The amplitude sorts 39a through 39m are stored in a bank of m histogram counters 40. Each of these m counters corresponds to a particular amplitude sorting slot. The amplitude sorts which are stored in the bank of histogram counters 40 over time will constitute a statistical distribution, or histogram, of the data amplitude sorts (see FIG. 3B).

A threshold level decision table 42 receives the outputs 41a–41m of the individual histogram counters 40. The decision table 42 reads the output lines of each of the counters 40a–m, analyzes the frequency distribution or histogram of this count data, and determines via the histogram real time changes in the amplitude of the received data signal. In this manner, the decision table 42 identifies the optimum threshold levels for each eye in the multi-level eye diagram. These optimum threshold levels correspond to the center of the respective eye openings and are obtained by identifying the middle of the depression in the histogram of the amplitude sorts. One threshold decision level is identified for each of the eye openings in the multi-level eye diagram.

The instantaneous amplitude readings of the received data signal read by the data amplitude sorting circuit 38, and the identified threshold decision levels obtained as described above, are each sent to the data regenerator 18. The data regenerator 18 uses these m+1 inputs, as well as the recovered clock signal 20, to regenerate the multi-level data signal in its originally transmitted form free of instantaneous frequency and amplitude distortion.

Figure 4A:
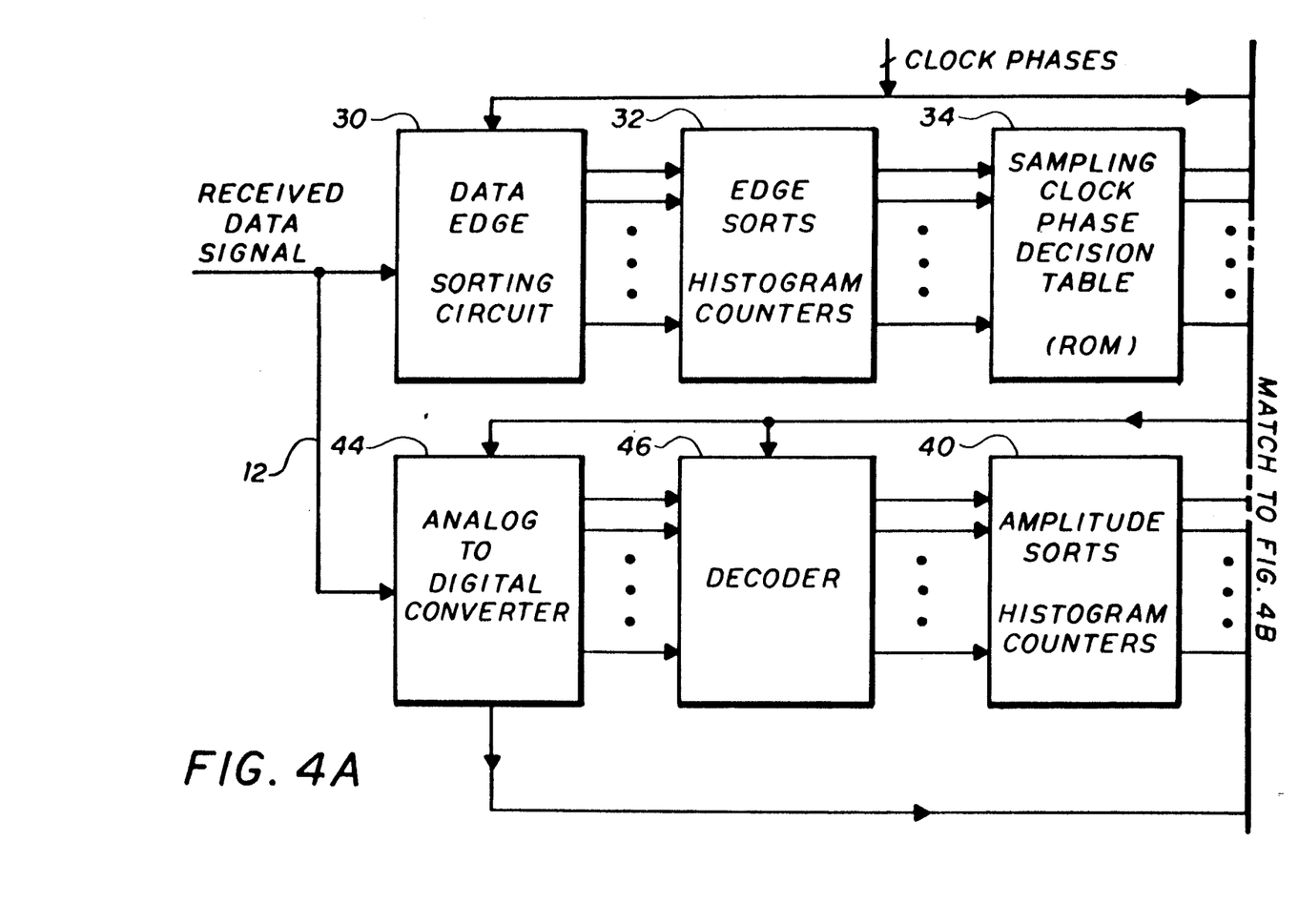
FIGS. 4A and 4B show a block diagram of a specific embodiment of the system of FIGS. 1A and 1B.
Figure 4B:
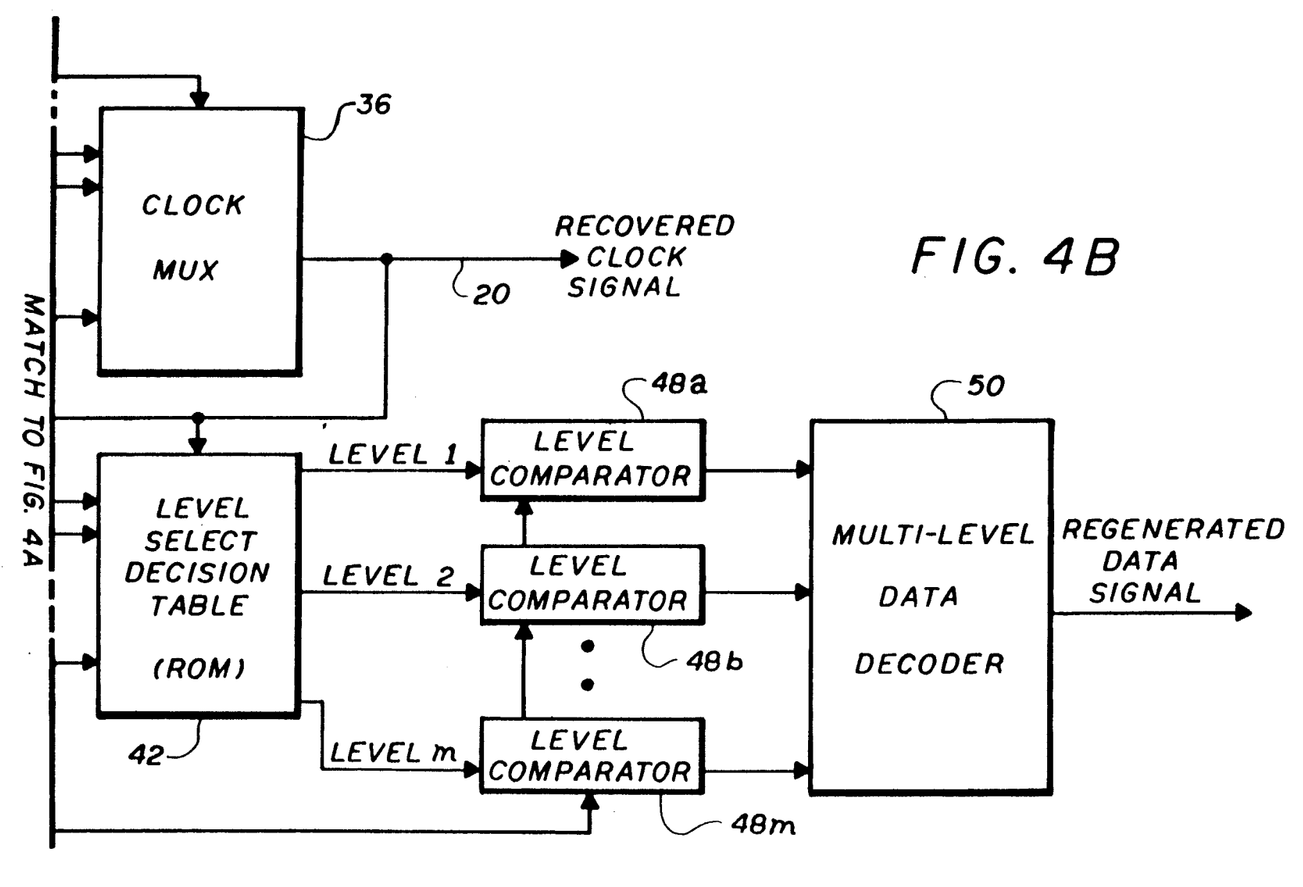

FIG. 4 shows a specific embodiment of the system 10 wherein (i) the data amplitude sorting circuit 38 comprises an analog-to-digital converter 44 and a decoder 46, and (ii) the data regenerator 18 comprises a series of level comparators 48a–m and a multi-level data decoder 50. The analog-to-digital converter 44 samples the received multi-level data signal 12 at times determined by the recovered clock signal 20. The output of the analog-to-digital converter 44 is decoded by decoder 46.

The threshold levels identified by the level select decision table 42 are fed into the level comparators 48a–m. These comparators may be either analog or digital comparators, depending on whether the circuit is implemented in analog or digital form. The comparators 48a–m determine if their input data value is above or below a predetermined threshold level. The outputs of the comparators are decoded by the multi-level data decoder 50 into a regenerated data signal.

Accordingly, the preferred embodiment of a multi-level digital data regeneration system has been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

We claim:

1. An adaptive regeneration system for reconstructing a signal received in the form of a multi-level composite data and clock signal which has been degraded with respect to amplitude and timing, said adaptive regeneration system comprising:

a clock recovery circuit for receiving said received multi-level signal and extracting a recovered clock signal;

a threshold level selection circuit for receiving said recovered clock signal and said received multi-level signal, detecting positive and negative going transitions in said received multi-level signal and storing representations of said transitions, and outputting, in real time, (i) a data amplitude reading corresponding to the instantaneous amplitude of the received multi-level signal, and (ii) a plurality of multi-level threshold levels corresponding to changing amplitude levels of the received multi-level signal; and a data regenerator for receiving said data amplitude reading, said plurality of multi-level threshold levels and said recovered clock signal and for reconstructing said received multi-level signal.

2. An adaptive regeneration system for reconstructing a signal received in the form of a multi-level composite data and clock signal which has been degraded with respect to amplitude and timing, said adaptive regeneration system comprising:

a local clock circuit comprising a local oscillator for outputting a local clock signal and a delay element electrically connected to said local oscillator for establishing a plurality of phase-delayed local clock signals;

a clock recovery circuit for receiving said received multi-level signal and said plurality of phase-delayed clock signals and extracting a selected phase-delayed local clock signal which most accurately represents the least phase shift between the received multi-level signal and said selected phase-delayed local clock signal;

a threshold level selection circuit for receiving said selected phase-delayed local clock signal and said received multi-level signal and outputting, in real time, (i) a data amplitude reading corresponding to the instantaneous amplitude of the received multi-level signal, and (ii) a plurality of multi-level threshold levels corresponding to changing amplitude levels of the received multi-level signal; and a data regenerator for receiving said data amplitude reading, said plurality of multi-level threshold levels and said selected phase-delayed signal and for reconstructing said received multi-level signal.

3. The adaptive regeneration system of claim 2, wherein said clock recovery circuit includes a first sorting circuit for sorting edge transitions in said received multi-level signal into discrete time intervals, and a plurality of counters for counting the number of edge transitions occurring within each of said discrete time intervals.

4. The adaptive regeneration system of claim 3, wherein said clock recovery circuit further comprises a multiplexer for selecting said selected phase-delayed local clock signal.

5. The adaptive regeneration system of claim 3, wherein the number of discrete time intervals is equal to the number of phase-delayed local clock signals.

6. The adaptive regeneration system of claim 5, wherein the sum of the delays of said plurality of phase-delayed local clock signals equals the period of said local clock signal.

7. The adaptive regeneration system of claim 3, wherein said threshold level selection circuit utilizes said selected phase-delayed local clock signal as a sampling pulse for said received multi-level signal.

8. The adaptive regeneration system of claim 7, wherein said threshold level selection circuit includes a second sorting circuit for sorting values of said instantaneous amplitudes of said received multi-level signal into a plurality of discrete voltage amplitude ranges, and a plurality of counters for counting the amplitude readings occurring within each of said plurality of discrete voltage amplitude ranges.

9. The adaptive regeneration system of claim 8, wherein said plurality of discrete voltage amplitude ranges are equally spaced over the full range of amplitudes of the received multi-level signal.

10. The adaptive regeneration system of claim 8, wherein said second sorting circuit comprises an analog-to-digital converter and a decoder, and said data regenerator comprises a series of comparators and a decoder.

11. A method of reconstructing a signal received in the form of a multi-level composite data and clock signal which has been degraded with respect to amplitude and timing, said method comprising the steps of:

outputting a plurality of phase-delayed local clock signals;

receiving said received multi-level signal and said plurality of phase-delayed clock signals and extracting a selected phase-delayed local clock signal which most accurately represents the least phase shift between the received multi-level signal and said selected phase-delayed local clock signal;

receiving said selected phase-delayed local clock signal and said received multi-level signal and outputting, in real time, (i) a data amplitude reading corresponding to the instantaneous amplitude of the received multi-level signal, and (ii) a plurality of multi-level threshold levels corresponding to the amplitude levels of the received multi-level signal;

receiving said data amplitude reading, said plurality of multi-level threshold levels and said selected phase-delayed signal; and reconstructing said received multi-level signal.

12. The method of claim 11, wherein said step of extracting a selected phase-delayed local clock signal includes the steps of sorting edge transitions in said received multi-level signal into discrete time intervals, and counting the number of edge transitions occurring within each of said discrete time intervals.

13. The method of claim 12, wherein a multiplexer is used for extracting said selected phase-delayed local clock signal.

14. The method of claim 12, wherein said step of outputting a data amplitude reading and a plurality of multi-level threshold levels includes a step of sampling said received multi-level signal at the rate of said selected phase-delayed local clock signal.

15. The adaptive regeneration system of claim 1, wherein said threshold level selection circuit includes (i) a sorting circuit for sorting values of said instantaneous amplitudes of said received multi-level signal into a plurality of discrete voltage amplitude ranges, and (ii) a plurality of counters for counting the amplitude readings occurring within each of said plurality of discrete voltage amplitude ranges.

* * * * *